Jan. 27, 1931. L. W. BUGBEE, JR 1,790,572
LENS INSPECTING AND LAY OUT DEVICE
Filed Oct. 17, 1927
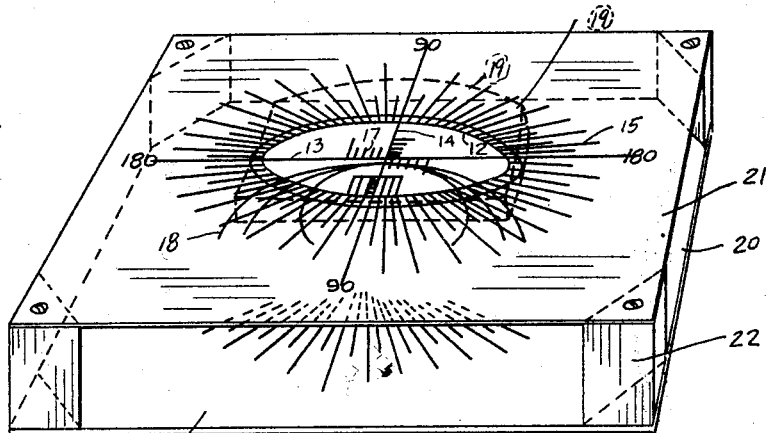
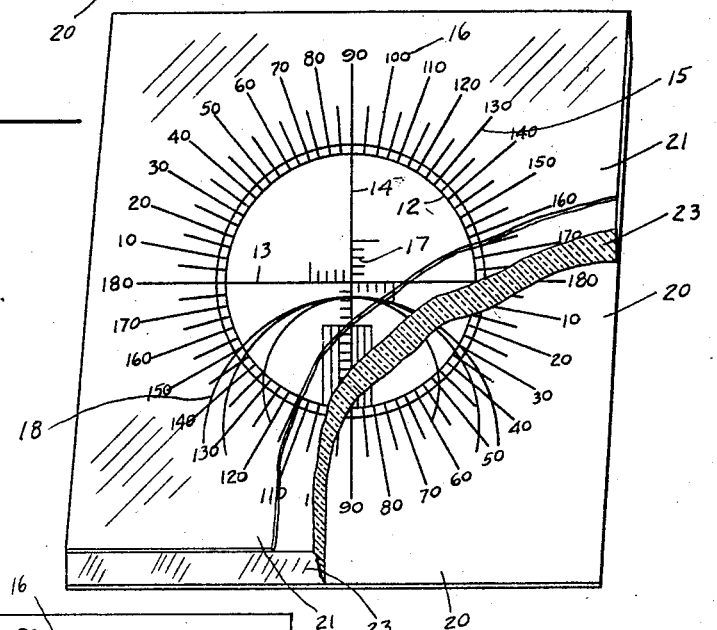
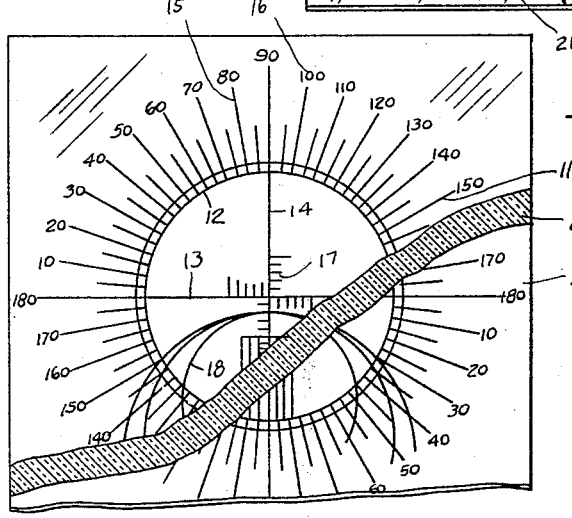
INVENTOR.
LUCIAN W. BUGBEE, JR.
BY
ATTORNEYS.

Patented Jan. 27, 1931

1,790,572

UNITED STATES PATENT OFFICE

LUCIAN W. BUGBEE, JR., OF INDIANAPOLIS, INDIANA, ASSIGNOR, BY MESNE ASSIGNMENTS, TO GEORGE C. FORREY, JR., OF INDIANAPOLIS, INDIANA

LENS INSPECTING AND LAYOUT DEVICE

Application filed October 17, 1927. Serial No. 226,771.

This invention is an improvement in means for inspecting and laying out ophthalmic lenses and particularly lens blanks. It is an improvement over and an advance on the protractors of the kind shown in the patents granted to Mr. Lucian W. Bugbee, No. 1,532,878, patented April 7, 1925, for Lens protractor, and to Lucian W. Bugbee, Jr., No. 1,532,880, patented April 7, 1925, for a Mirrored lens protractor.

There has been great inaccuracy and difficulty in using protractors for inspecting or laying out lens blanks due to the difficulty of the workman or inspector to vertically align his eye with the marking on the chart below or on the protractor. This is vitally necessary to accurate inspection or laying out lenses or blanks.

The chief feature of the invention herein consists of providing two substantially similar charts spaced apart one above the other or so that the line of vision from the eye of the workman will be perpendicular with any corresponding line or mark on the two charts. This will insure the workman that his eye is in proper vertical alignment with each chart. Means for maintaining said two charts in proper relation and spaced apart may be varied as hereafter appears.

The nature of the invention will be understood from the accompanying drawings and the following description and claims.

In the drawings Fig. 1 is a perspective view of means for inspecting and laying out lens blanks embodying said invention in which two similar charts are maintained by a frame in spaced relation with each other, with a lens blank associated therewith in dotted lines. Fig. 2 is a similar view of a modified arrangement wherein the two charts are maintained in spaced relation by an intervening glass plate. Fig. 3 is a similar view of a modified arrangement wherein the upper chart is marked on the upper surface of a glass plate with a lower chart below the said glass plate.

There is shown in all forms illustrated in the drawings two charts, a lower chart and an upper chart, similar to those heretofore used, particularly for inspecting and laying out one-piece bifocal blanks. Each chart shown has a circle 12 and two primary meridian lines 13 and 14 traversing the same. From the circle radiating lines 15 are indicated representing various degrees of a circle and these degrees are indicated by the numerals 16, so that each end of the meridian line 12 is marked "180" and each end of the meridian line 14 is marked "90." On the meridian lines appear millimeter scales 17 common in such charts. There are also three curved lines 18 shown by parts of a circle of this curvature but tangential to each other and these are located on the lower half of the circle 12, for the purpose of properly locating bifocal lenses or blanks on said device. A lens blank 19 is placed on the device with the division line between the bifocal surfaces thereof coinciding with two corresponding lines 18 on both charts. Then the position of the parts of the lens blank are indicated and located relative thereto as is well known in the art.

In the form shown in Fig. 1 the two charts 10 and 11 are placed on plates 20 and 21 and maintained parallel with each other by connections 22. The lower chart is on plate 20 and the upper chart on plate 21 and the upper plate must be transparent. This arrangement will hold the two charts permanently and properly spaced from each other.

In the form shown in Fig. 2 the two plates 20 and 21 containing the charts are maintained in proper spaced relation to each other by an intervening transparent plate preferably a glass plate 23 of uniform thickness.

In the form shown in Fig. 3 the upper chart 11 is placed directly on the glass plate 23, thus omitting plate 21. This will maintain the proper spaced relation between the charts.

The invention is, therefore, not limited to the means or manner of maintaining the two charts in proper spaced relation as other means for accomplishing this may readily occur to those skilled in the art.

It is thus seen that with the upper chart in spaced relation with the lower charts, the two charts enable the workman to be sure his eye is in vertical alignment with the chart below and, therefore, enable him to correctly lay out the blank. In the mirror protractor shown in applicant's prior patent, No. 1,532,880, only one chart is used. A mirror below enabled the workman to determine whether his eye was in vertical alignment with the markings of the chart, when the markings on the chart was in alignment with its image in the mirror, but only one part of the chart was so aligned at any given position of the operator's eyes. Therefore, to lay out successive points he is obliged to shift his eye until the necessary point and its image is also aligned.

This new device enables the lower chart to be on an opaque surface and printed on a contrasting background so that the alignment is very clearly discovered and indicated, since the lower chart may be very brilliant in appearance. Also the opaque mounting of the lower chart is very durable.

It is not always necessary or desirable to have exactly the same markings on both the upper and lower charts. Only those markings which are necessary for correctly aligning the operator's eye, the work, and the protractor markings, are required. In the present device the markings on the upper and lower charts may be varied according to the desire, while in the mirrored chart in my previous application the image shown must be exactly a reproduction of the upper chart.

The invention claimed is:

1. A device for laying-out and inspecting ophthalmic lens blanks, said device including a transparent lens supporting protractor chart, a lower protractor chart with similar markings corresponding with some of the markings on the upper chart, and means for maintaining said charts spaced apart and parallel with each other and with the corresponding markings of the charts in registry with each other.

2. A device for laying-out and inspecting ophthalmic lens blanks, substantially as set forth in claim 1, with the means for maintaining said charts spaced apart and parallel consisting of a plate of glass of uniform thickness.

3. A device for laying-out and inspecting ophthalmic lens blanks, said device including a lens supporting transparent plate having marked thereon a protractor chart, a spacer plate of relatively thick glass of uniform thickness upon which said transparent chart plate is placed, and a lower plate on which said spacer plate of glass is placed and which has on it a protractor chart with markings corresponding and in registry with some of the markings on the protractor chart of the top plate.

In witness whereof, I have hereunto affixed my signature.

LUCIAN W. BUGBEE, Jr.